(12) United States Patent
McKay et al.

(10) Patent No.: US 8,538,824 B1
(45) Date of Patent: Sep. 17, 2013

(54) METHODS SYSTEMS AND COMPUTER PROGRAM PRODUCTS FOR NOTIFYING CONSUMERS OF RECURRING PURCHASES

(75) Inventors: Phillip J. McKay, Monterey, CA (US);
Michael J. Graves, Sunnyvale, CA (US)

(73) Assignee: Intuit Inc., Mountain View, CA (US)

( * ) Notice: Subject to any disclaimer, the term of this patent is extended or adjusted under 35 U.S.C. 154(b) by 319 days.

(21) Appl. No.: 12/846,701

(22) Filed: Jul. 29, 2010

(51) Int. Cl.
*G06Q 30/00* (2012.01)

(52) U.S. Cl.
USPC ........................................................ 705/26.1

(58) Field of Classification Search
USPC ............................................... 705/26.1, 27.1
See application file for complete search history.

(56) References Cited

U.S. PATENT DOCUMENTS

| | | | |
|---|---|---|---|
| 6,026,376 A | 2/2000 | Kenney | |
| 6,487,540 B1 | 11/2002 | Smith et al. | |
| 6,738,749 B1 | 5/2004 | Chasko | |
| 7,130,814 B1 * | 10/2006 | Szabo et al. | 705/26.8 |
| 7,353,194 B1 | 4/2008 | Kerker et al. | |
| 7,455,226 B1 | 11/2008 | Hammond et al. | |
| 7,552,087 B2 | 6/2009 | Schultz et al. | |
| 7,555,476 B2 | 6/2009 | Holobrook | |
| 7,742,989 B2 | 6/2010 | Schultz | |
| 7,792,709 B1 | 9/2010 | Trandal et al. | |
| 7,987,120 B2 | 7/2011 | Shiftan et al. | |
| 8,095,439 B1 | 1/2012 | Harman et al. | |
| 2001/0029483 A1 | 10/2001 | Schultz et al. | |
| 2001/0037207 A1 | 11/2001 | Dejaeger | |
| 2002/0069115 A1 | 6/2002 | Fitzpatrick | |
| 2003/0020762 A1 | 1/2003 | Budrys et al. | |
| 2003/0055733 A1 | 3/2003 | Marshall et al. | |
| 2003/0126020 A1 | 7/2003 | Smith et al. | |
| 2004/0220964 A1 | 11/2004 | Shiftan et al. | |
| 2004/0225567 A1 | 11/2004 | Mitchell et al. | |
| 2005/0049928 A1 | 3/2005 | Naick et al. | |
| 2005/0080683 A1 | 4/2005 | Jordan | |
| 2006/0038003 A1 | 2/2006 | Wakasa et al. | |
| 2006/0273163 A1 | 12/2006 | Gusler et al. | |
| 2007/0069013 A1 | 3/2007 | Seifert et al. | |
| 2007/0094087 A1 | 4/2007 | Mitchell et al. | |
| 2007/0164106 A1 | 7/2007 | McDevitt et al. | |
| 2007/0288322 A1 | 12/2007 | Watanabe | |
| 2008/0235749 A1 | 9/2008 | Jain et al. | |
| 2009/0096590 A1 * | 4/2009 | Grundelman | 340/309.16 |
| 2009/0271265 A1 | 10/2009 | Lay et al. | |
| 2010/0257066 A1 * | 10/2010 | Jones et al. | 705/17 |
| 2010/0306080 A1 | 12/2010 | Trandal | |

OTHER PUBLICATIONS

File History of U.S. Appl. No. 12/609,922, filed Oct. 30, 2009.

(Continued)

*Primary Examiner* — Brandy A Zukanovich
(74) *Attorney, Agent, or Firm* — Vista IP Law Group LLP

(57) ABSTRACT

Systems, methods and computer program products for identifying recurring purchases of the same good or service based upon item-level electronic transaction data. Item-level electronic transaction data is analyzed to determine a purchase interval of a good or service. A consumer is reminded to purchase the good or service based on the determined purchase interval by receiving an electronic message at a consumer computer or mobile communication device, e.g., in the form of an electronic shopping list. Purchase intervals of different items may be determined such that a list generated at one time may include certain goods and services but a list generated at another time may include other goods and services due to the variable time between purchasing different goods and services.

46 Claims, 14 Drawing Sheets

(56) References Cited

OTHER PUBLICATIONS

Office Action dated Dec. 30, 2010 in U.S. Appl. No. 12/609,922, filed Oct. 30, 2009 (22 pages).
Interview Summary dated Mar. 8, 2011 in U.S. Appl. No. 12/609,922, filed Oct. 30, 2009 (3 pages).
Amendment dated Mar. 30, 2011 in U.S. Appl. No. 12/609,922, filed Oct. 30, 2009 (9 pages).
Interview Summary dated May 23, 2011 in U.S. Appl. No. 12/609,922, filed Oct. 30, 2009 (3 pages).
Amendment dated Jun. 13, 2011 in U.S. Appl. No. 12/609,922, filed Oct. 30, 2009 (13 pages).
File History of U.S. Appl. No. 12/650,343, filed Dec. 30, 2009.
Office Action dated Aug. 29, 2011 in U.S. Appl. No. 121650,343, filed Oct. 30, 2009 (25 pages).
Interview Summary dated Nov. 21, 2011 in U.S. Appl. No. 12/650,343, filed Oct. 30, 2009 (3 pages).
http://www.bnet.com/blog/mobile-internet/the-future-of-online-coupons-scarily-personalized-offers-based-on-your-history/692 (7 pages).
"Bippy", Jul. 29, 2010, http://bippy.com.internet (5 pages).
"The Neat Company", Jul. 29, 2010, http://www,neatco.com.internet (7 pages).
"The Neat Company User Guide", Jul. 29, 2010, http://www.neatco.com/media/12224/neatworks4_guide2.pdf.internet (147 pages).
"Quick Receipts", Jul. 29, 2010, http://myquickreceipts.intuit.com/. internet (12 pages).
"The Smart Refrigerator", Jul. 29, 2010, http://cs.nyu.edu/~jml1414/ui/assign3/smart_refrig.html.internet (3 pages).
File History of U.S. Appl. No. 12/625,540, filed Nov. 24, 2009.
Office Action dated Oct. 3, 2011 in U.S. Appl. No. 12/625,540, filed Nov. 24, 2009 (15 pages).
"Blippy", Jul. 29, 2010, http://blippy.com, internet (5 pages).
"The Neat Company", Jul. 29, 2010, http://www.neatco.com, internet (7 pages).
"The Neat Company User Guide", Jul. 29, 2010, http://www.neatco.com/media/12224/neatworks4_guide2.pdf, internet (147 pages).
"Quick Receipts", Jul. 29, 2010, http://myquickreceipts.intuit.com/, internet (12 pages).
"The Smart Refrigerator", Jul. 29, 2010, http://cs.nyu.edu/~jml1414/ui/assign3/smart_refrig.html, internet (3 pages).
Notice of Allowance dated Oct. 11, 2011 in U.S. Appl. No. 12/609,922, filed (9 pages).
Interview Summary dated Mar. 14, 2012 in U.S. Appl. No. 13/286,101, filed Oct. 31, 2011, (2 pages).
Office Action dated May 22, 2012 in U.S. Appl. No. 13/286,101, filed Oct. 31, 2011, (16 pages).
Interview Summary dated Aug. 20, 2012 in U.S. Appl. No. 13/286,101, filed Oct. 31, 2011, (3 pages).
Amendment dated Aug. 21, 2012 in U.S. Appl. No. 13/286,101, filed Oct. 31, 2011, (13 pages).
Final Office Action dated Sep. 26, 2012 in U.S. Appl. No. 13/286,101, filed Oct. 31, 2011 (22 pages).
Amendment after Final dated Nov. 26, 2012 in U.S. Appl. No. 13/286,101, filed Oct. 31, 2011, (7 pages).
Notice of Allowance dated Dec. 26, 2012 in U.S. Appl. No. 13/286,101, filed Oct. 31, 2011 (15 pages).
Amendment dated Nov. 29, 2011 in U.S. Appl. No. 12/358,588, filed Dec. 30, 2009 (17 pages).
Office Action dated Nov. 8, 2012 in U.S. Appl. No. 12/982,793, filed Dec. 30, 2010 (16 pages).
Amendment dated Mar. 11, 2013 in U.S. Appl. No. 12/982,793, filed Dec. 30, 2010 (14 pages).
Office Action dated Nov. 13, 2012 in U.S. Appl. No. 13/008,808, filed Jan. 18, 2011 (23 pages).
Amendment dated Feb. 13, 2013 in U.S. Appl. No. 13/008,808, filed Jan. 18, 2011 (17 pages).
Amendment dated Feb. 3, 2012 in U.S. Appl. No. 12/625,540, filed Nov. 24, 2009 (12 pages).
Final Office Action dated Apr. 5, 2012 in U.S. Appl. No. 12/625,540, filed Nov. 24, 2009 (22 pages).

* cited by examiner

400

ITEM-LEVEL ELECTRONIC TRANSACTION DATA

| Consumer ID (402) | Purchase Date (404) | Item ID (406) | Quantity (408) |
|---|---|---|---|
| Consumer ID 1 | Purchase Date 1 | Item ID 1 | 1 |
| Consumer ID 1 | Purchase Date 1 | Item ID 2 | 1 |
| Consumer ID 1 | Purchase Date 1 | Item ID 3 | 1 |
| Consumer ID 1 | Purchase Date 2 | Item ID 1 | 1 |
| Consumer ID 1 | Purchase Date 3 | Item ID 1 | 1 |
| Consumer ID 1 | Purchase Date 4 | Item ID 1 | 1 |
| Consumer ID 1 | Purchase Date 5 | Item ID 1 | 1 |

DATES SPECIFIC ITEMS PURCHASED

| Cereal 1 (C1) (CHEERIOS) | Cereal 2 (C2) (RAISIN BRAN) | Diapers (D) (PAMPERS) | Paper Towels (PT) (BRAWNY) |
|---|---|---|---|
| May 1 | May 1 | May 1 | May 1 |
| May 8 |  | May 8 |  |
| May 15 | May 15 |  |  |
| May 22 |  | May 22 |  |
| May 29 | May 29 |  |  |
| June 5 |  |  | June 5 |

```
| May 1    May 8    May 15    May 22    May 29    June 5
|----------------------------------------------------------------
| C1       C1       C1        C1        C1        C1
| C2                C2                  C2
| D        D                  D
| PT                                              PT
```

PURCHASE INTERVALS

| Cereal 1 (CHEERIOS) | Cereal 2 (RAISIN BRAN) | Diapers (PAMPERS) | Paper Towels (BRAWNY) |
|---|---|---|---|
| 7 days | 14 days | 14 days | 30 days |

| Shopping List - June 12 |
| --- |
| Cereal 1 (C1) (CHEERIOS) |
| Diapers (D) (PAMPERS) |

| Shopping List - June 19 |
| --- |
| Cereal 1 (C1) (CHEERIOS) |
| Cereal 2 (C2) (RAISIN BRAN) |

| Shopping List - June 26 |
| --- |
| Cereal 1 (C1) (CHEERIOS) |
| Diapers (D) (PAMPERS) |
| Paper Towels (PT) (BRAWNY) |

| Consumer 1 - Shopping List - June 12 |
|---|
| CHEERIOS |
| PAMPERS |

| Consumer 2 - Shopping List - June 12 |
|---|
| CHEERIOS |
| RAISIN BRAN |
| FROSTED FLAKES |
| IVORY |
| COCA-COLA |
| PIZZA |

| Consumer 3 - Shopping List - June 12 |
|---|
| LETTUCE |
| ONIONS |
| CARROTS |
| CHIPS AHOY |

FIG. 9D

METHODS SYSTEMS AND COMPUTER PROGRAM PRODUCTS FOR NOTIFYING CONSUMERS OF RECURRING PURCHASES

BACKGROUND

Consumers or shoppers purchase various goods and services at various times. For example, consumers purchase goods such as groceries and other consumables including food items such as cereal, meat, milk and baby formula, toiletries such as toilet paper and paper towels and bathroom supplies such as toothpaste, floss, mouthwash, etc. These items may be consumed and purchased weekly, every other week, once a month, and at other times depending on the quantity of items purchased each time and how quickly they are consumed. The rate at which such goods and services are consumed and how often they must be purchased again may be affected by various factors such as the number of people in a consumer's family, consumer preferences and circumstances. In addition, these factors may change over time as people join a family, preferences change and new products become available.

Given the nature of consumable goods and services, they are used or needed at different rates and at different times. For example, consumers may or may not know how much of a particular good remains and whether it is necessary to purchase the good again. Consequently, when consumers shop at one or more stores, they may not know that they need to purchase a particular good or may forget about the good, thereby resulting in the consumer forgoing such goods until the next shopping trip or requiring the consumer to go out again to one or more stores to purchase forgotten goods. These shortcomings resulting from reliance on consumer memory result in inconvenience and loss of valuable time and money due to consumers driving and walking around stores purchasing goods that could have been purchased during an earlier shopping trip.

SUMMARY

In one embodiment, recurring purchases of a specific item (a specific good or service) are identified, a purchase interval for that specific item is determined, and an electronic message is sent, e.g., in the form of an electronic shopping list, to the consumer. The message or electronic shopping list alerts or reminds the consumer about which specific item or type of item to purchase or to check whether it is necessary to purchase the item again.

One embodiment is directed to a computer-implemented method for notifying a consumer about purchasing a previously purchased item (good or service) again. The method comprises receiving, at a host or intermediate computer, item-level electronic transaction data that represents prior purchases by the consumer. The method further comprises identifying, with a purchase interval program executing on or accessible by the intermediate computer, item-level electronic transaction data of recurring purchases of a particular, specific item. The method further comprises determining a purchase interval of the item or a time between purchases of the same item by the consumer, generating an estimate, e.g., in the form of a future date, when the consumer will purchase the specific item again based at least in part upon the determined purchase interval or how quickly the consumer uses or consumes the specific item. A notification is then sent to the consumer, e.g., before or on the estimated date or sent on a date selected by the consumer, to remind the consumer about purchasing the item. The notification may identify the exact item purchased before (e.g., a particular brand of cereal) or identify a category or type of the item (e.g., cereal).

Another embodiment is directed to a computer program product comprising a non-transitory computer readable storage medium such as an optical disc that embodies one or more instructions executable by a host or intermediate computer to perform a process for notifying a consumer about recurring purchases of the same item (good or service). The instructions are executable to perform a process comprising receiving, at the intermediate computer, item-level electronic transaction data representing prior purchases by the consumer and identifying item-level electronic transaction data of recurring purchases of a specific, particular item by the consumer. The instructions are also executable to determine a purchase interval of the specific item or a time between purchases of the item, generate an estimate of when the consumer will need to purchase the item again based at least in part upon the determined purchase interval, and notify the consumer about purchasing the item again, e.g., before or on the estimated date or on a date selected by the consumer.

A further embodiment is directed to a system for notifying a consumer about recurring purchases of the same item (good or service). The system comprises an intermediate or host computer that is operably coupled to or in communication with one or more sources of item-level transaction data through a network and operably coupled to or in communication with a computing device of a consumer through a second network. For example, the source may be a merchant computing device such as a Point of Sale (POS) terminal, a financial institution computer that processed a transaction involving the consumer, e.g. when the consumer used a debit or credit card of the financial institution, a financial management system that is in communication with merchant computing devices to receive merchant data from a subscribing merchant and/or to access consumer accounts reflecting completed transactions and including item-level electronic transaction data. The system further comprises a purchase interval program executing on or accessible by the intermediate computer. The purchase interval program is configured to receive, at the intermediate computer, item-level electronic transaction data representing prior purchases by the consumer from a source, identify item-level electronic transaction data of recurring purchases of a specific, particular item by the consumer, determine a purchase interval of the specific, particular item, generate an estimated date when the consumer will purchase the item again based at least in part upon the determined purchase interval, and notify the consumer about purchasing the item again, e.g., before or on the estimated date or on a date selected by the consumer.

BRIEF DESCRIPTION OF THE DRAWINGS

The foregoing and other aspects of embodiments are described in further detail with reference to the accompanying drawings, wherein:

FIG. 4 illustrates an example of a table that may be generated by embodiments to store item-level electronic transaction data for specific items;

FIGS. 6A-F illustrate examples of how embodiments may be implemented, wherein FIG. 6A is a table of item-level electronic transaction data showing prior purchase dates of various specific items, FIG. 6B, is a timeline of item purchases shown in FIG. 6A; FIG. 6C is a table of purchase intervals for different items based upon data of FIGS. 6A-B; and FIGS. 6D-F illustrates outputs of a purchase interval program in the form of shopping lists based upon prior purchases of the same items by the consumer;

FIGS. 9A-D illustrate outputs of a purchase interval program in the form of shopping lists for respective consumers according to embodiments.

DETAILED DESCRIPTION OF ILLUSTRATED EMBODIMENTS

Figure 1:
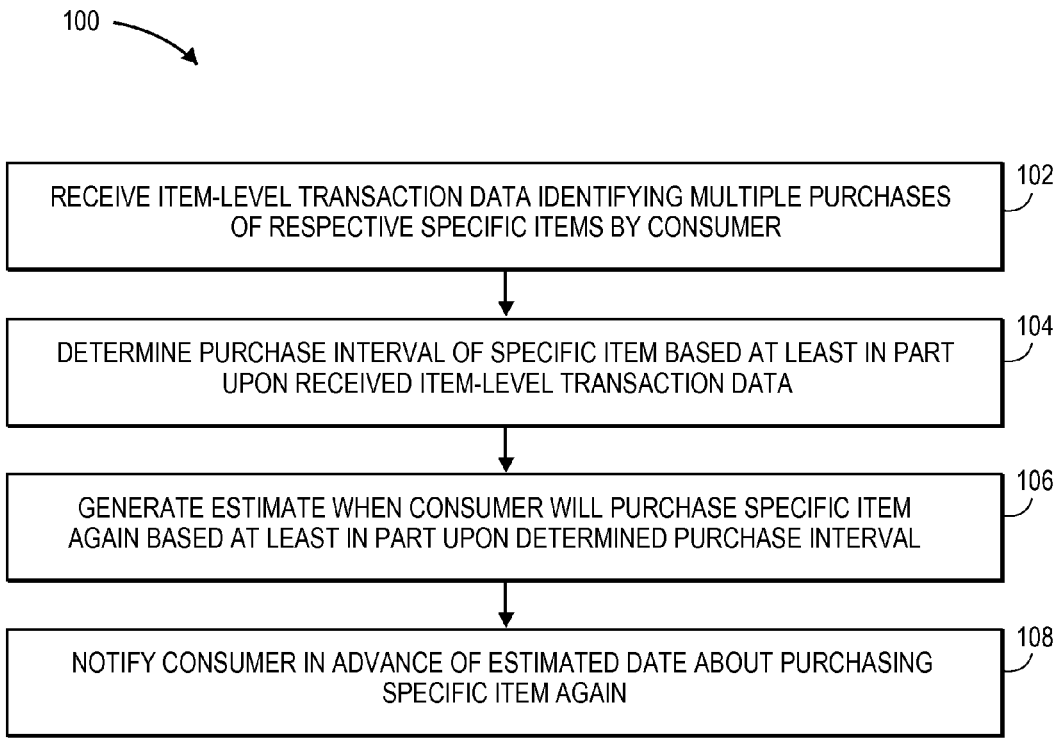
FIG. 1 is a flow chart of one embodiment of a method for notifying a consumer about purchasing an specific item that the consumer previously purchased.

Referring to FIG. 1, embodiments of the invention relate to methods, systems and computer program products for identifying recurring purchases of specific items. An "item" is defined herein as including a good or a service. According to one embodiment, a method for notifying consumers about recurring purchases comprises, at 102, item-level transaction data being received from one or more sources at a host or intermediate computer. Item-level transaction data identifies multiple purchases of a specific, particular item by consumer. At 104, the time between purchases of the specific item, or the purchase interval, is determined based at least in part upon received item-level electronic transaction data. At 106, an estimate, e.g., an estimated date of when consumer will purchase specific item again, is determined based at least in part upon the last purchase date of the item and the determined purchase interval. At 108, consumer is notified in advance of or on estimated date, e.g., in the form of an electronic message sent from intermediate computer to a computing or communication device of consumer to notify consumer of the item by specific brand, name or type and that it may be necessary to purchase the item again.

A purchase interval program can be part of a desktop or on-line financial management system such as QUICKRECEIPTS, available from Intuit Inc., which is configured to receive item-level data from merchant payment devices and/or part of a desktop or on-line financial management system such as QUICKEN and MINT, both of which are also available from Intuit Inc., and that are linked to consumer accounts to receive or retrieve item-level data within accounts. Such systems can categorize and display receipt and financial data to a consumer. The purchase interval program may be a part of an accounting program such as QUICKBOOKS, available from Intuit Inc. and other programs, that allow a user to manage payroll, inventory, sales and other business matters such that embodiments may be utilized to track recurring purchases of business-related items and to remind office or inventory managers to re-order certain items.

An electronic message sent to the consumer may identify one or multiple items that may need replacement in an electronic shopping list. As another example, embodiments may determine that the consumer purchases services once a month and send a reminder to the consumer before or on the estimated date when such services are needed again or on a date selected by the consumer. If the consumer does not need the identified item, the electronic message can be ignored. The electronic shopping list provided to a consumer may include a single item or multiple items depending on, for example, how often shopping lists are generated, the number of items tracked by embodiments and the purchase intervals of such items. For example, the consumer may purchase a particular cereal weekly, but purchase other products such as eggs every two weeks and paper towels once a month. Thus, an electronic shopping list generated on a weekly basis would include cereal each week, but only some weekly shopping lists would include eggs and paper towels.

In a single or multiple embodiments, the item-level electronic transaction data, such as Level III data, identifies purchases of specific, particular items by item name, description, serial number, code, symbol or other specific item identifier. For example, Level III data may identify a particular brand or provider of cereal, diapers, and various services. Item-level electronic transaction data may be received from one or multiple sources. The multiple sources may be the same type or different types of sources. For example, in various embodiments, the sources are different stores of the same merchant, different merchants, a financial management system or program such as a system or program that collects item-level electronic transaction data from participating merchants and/or that accesses consumer accounts to receive or retrieve such data, a merchant and a financial institution, a merchant and a financial management system, a financial management system and a financial institution, and other combinations and sources of item-level electronic transaction data. Thus, as an example, item-level electronic transaction data is received from a first source such as a first merchant having a first electronic payment device and from whom the consumer purchased an item a first time, and from a second source such as a second merchant having a second electronic payment device and from whom the consumer purchased the same item a second time. This data may be collected by a financial management system that is operably coupled to or in communication with electronic payment devices of merchants. As another example, at least one of the sources may be a financial institution that processed a transaction involving the merchant and consumer and has item-level electronic transaction data, e.g., if the consumer paid for an item using a financial institution debit or credit card. This data may be collected or accessed by a financial management system that is operably coupled to or in communication with consumer accounts such as savings, checking, credit card, and other types of accounts at various financial institutions.

In a single or multiple embodiments, the purchase interval program is a stand alone program executing on or accessible by the intermediate or host computer. In other embodiments, the purchase interval program is a component or module of a financial management system (examples of which include QUICKRECEIPTS, QUICKEN, FINANCEWORKS, Mint.com, MICROSOFT Money, etc.), which is hosted or accessible by the intermediate computer.

Further, a user may provide transaction data, e.g., in the form of a paper or electronic receipt such as an e-mail message, which is analyzed by the purchase interval program to determine purchases of specific items. Text recognition may also be utilized to determine item-level details of a paper receipt or a copy or photograph of the receipt using Optical Character Recognition (OCR) or another suitable method. In a single or multiple embodiments, the purchase interval program determines whether specific item has been purchased a threshold or minimum number of times before determining a purchase interval for that item. In this manner, embodiments ensure that it is more likely that the purchase interval that is determined is an accurate reflection of future consumer spending based upon an acceptable sampling of prior spending. According to one embodiment, the purchase interval is calculated as an average number of purchases in a given time (e.g., item is purchased once a week, once a month, once every three months, etc.). The minimum or threshold number of purchases can be defined separately for different products or types of products such that a recurrent purchase pattern for different goods and services is established with different numbers of purchases of the goods and services. For example, a recurrent purchase pattern for staple foods such as milk may require a small number of purchases to establish a purchase pattern, whereas a recurrent purchase pattern for other items such as car washes may require a larger number of purchases to establish a purchase pattern. The number of purchases required to establish a purchase pattern to be utilized in embodiments may be determined based upon user input, predefined rules, or an analysis of purchasing behavior.

In a single or multiple embodiments, a consumer is notified of results generated by the purchase interval program by an electronic message such as an electronic mail (e-mail), text or Short Message Service (SMS) or other message sent from the intermediate computer to a mobile communication device or computing device of the consumer. In another embodiment, the message can be displayed to the consumer, e.g., when the consumer accesses the intermediate computer to use the purchase interval program or to use a financial management system or receipt program that includes the purchase interval program or when the consumer logs onto a financial management system or receipt program.

In a single or multiple embodiments, after a threshold or minimum number of item purchases have been analyzed and a first purchase interval determined, the purchase interval program continues to monitor subsequent purchases of the same item to determine whether the purchase interval should be adjusted. These embodiments utilize a feedback mechanism to determine whether the purchase interval and reporting to the consumer should be dynamically adjusted as purchase behavior changes. For example, if the consumer changes purchase behavior and purchases an item less frequently in a given time, then the purchase interval program can dynamically re-calculate the purchase interval for future purchases, and messages sent to the consumer will be based on the updated purchase interval. In one embodiment, monitoring purchase activity can be performed continuously such that the purchase interval is fine tuned and adapted to changing consumer behavior. In one embodiment, changes to purchase intervals can be made upon detection of a change or after a certain period of time during which the changed behavior is observed. Embodiments may involve tracking purchases of one item or multiple items such that the message sent to the consumer involves one or multiple items. Further, in embodiments involving multiple items, the purchase intervals for different items may be different, thereby resulting in one message (e.g. a first bi-weekly or monthly message) relating to a particular item or group of items, and another message (e.g., a later, second bi-weekly or monthly message) relating to a different item or group of items. For example, goods and services may have purchase intervals of one week, two weeks, one month, two months, three months, etc. Thus, the "shopping list" generated by the purchase interval program may identify different goods and services at different times due their respective purchase intervals. A shopping list may include only goods, only services or a combination thereof.

Thus, embodiments assist consumers by determining which items should be purchased due to those items being consumed, or close to being consumed, in view of their actual historical spending on such items and based at least in part upon item-level electronic transaction data representing their purchases. Thus, while the estimated date may or may not identify the exact date a consumable will need to be replaced or a service is needed, it is accurate in that it is based on actual consumer spending data, and consumers are better prepared for shopping and conduct shopping in a more efficient manner by reducing or eliminating trips to one or more stores or reducing the frequency of shopping based on notifications provided by embodiments. Further, with embodiments, consumers are less likely to go without items since they will be reminded to purchase items before or close to when the item has been fully consumed based on the consumer's actual purchase history. Embodiments and aspects thereof are described in further detail with reference to FIGS. 2A-10.

Figure 2A:
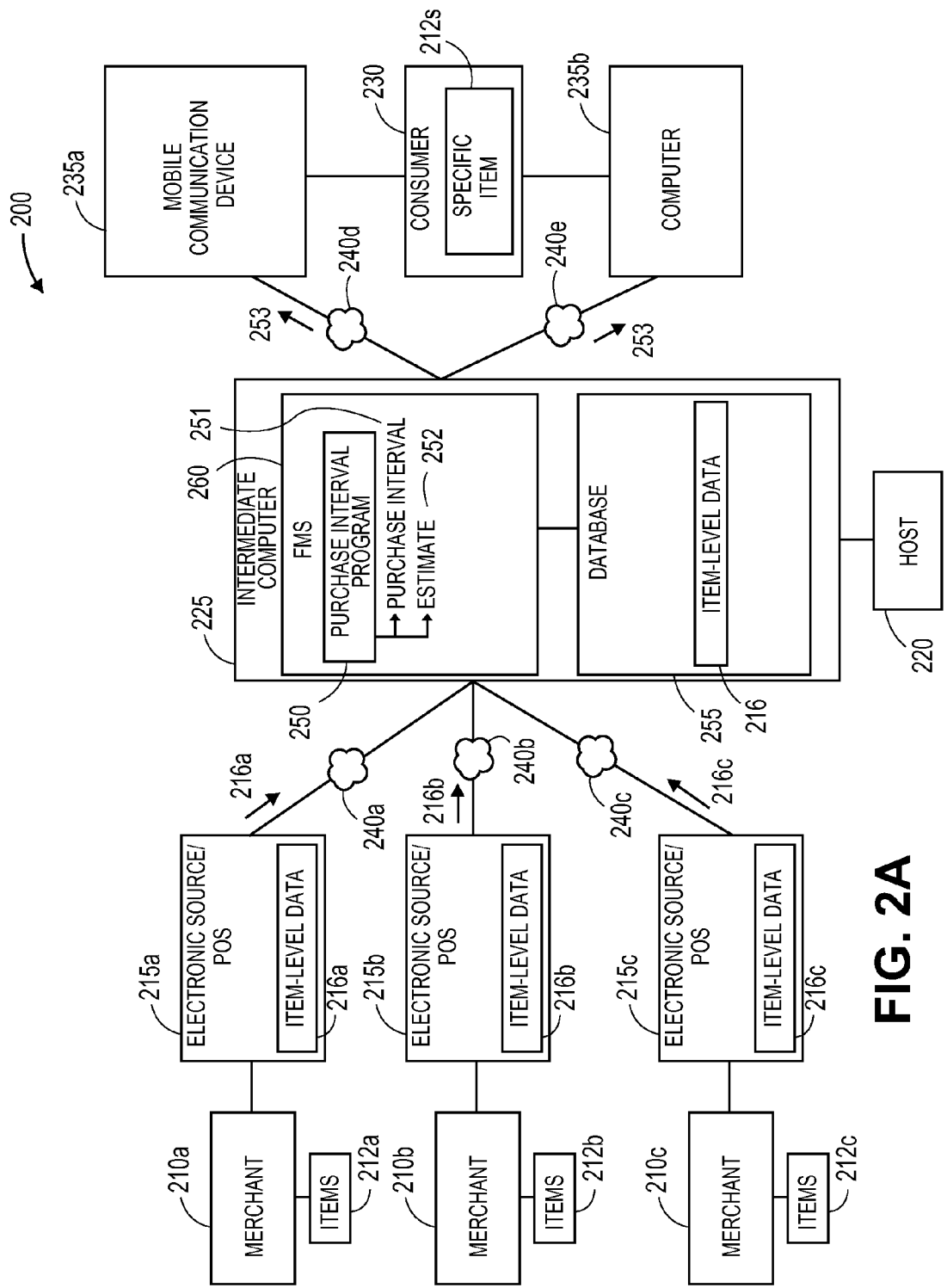
FIG. 2A is a diagram of one embodiment of a system for notifying a consumer about purchasing a specific item that the consumer has previously purchased in which an intermediate computer has a financial management system in the form of a receipt collection system that is in communication with a merchant computing device to receive item-level electronic transaction data from the merchant.

Referring to FIG. 2A, a system 200 constructed according to one embodiment for identifying recurring item purchases comprises or involves one or more merchants 210a-c who offer various items 212 for sale, a host 220 who collects data from merchants 210 and other originators of item-level electronic transaction data 216, and a consumer 230 who purchases a particular or specific item 212s ("s" referring to "specific" item) multiple times from one or more merchants 210.

FIG. 2A illustrates multiple merchants 210a-c (generally, 210) that utilize respective electronic or computing devices or sources 215a-c (generally, electronic source 215) of item-level electronic transaction data 216a-c (generally, 216). While FIG. 2A illustrates three merchants 210a-c, embodiments may involve one or multiple merchants 210 and may involve different or the same merchants 210 (e.g., the same store at different locations). Electronic source 215 may be, for example, an electronic payment device such as a Point of Sale (POS) payment terminal, a cash register, a computer and a scanner system utilized by merchant 210. Item-level electronic transaction data 216 is generated by electronic source 215 and represents each purchase of the specific item 212s by the consumer 230.

As defined in this specification, item-level electronic transaction data 216 identifies a specific, particular item 212s, a specific, particular good or service, purchased by consumer 230 (e.g., a particular type of cereal such as CHEERIOS or a particular type of diapers such as PAMPERS). Item-level electronic transaction data 216 that specifically identifies an item may include name or brand, description, product number, product code, symbol and other identifications. One example of item-level electronic transaction data 216 that may be used for this purpose is Level III data such as item quantity, item codes, descriptions and full line item details of items purchased by consumer 230.

Electronic sources 215 such as POS payment terminals are operably coupled to or in communication with intermediate computer 225 managed by host 220, an example of which is Intuit Inc. or another host 220 that collects electronic transaction or receipt data such as Afterbot, Inc. Intermediate computer 225 is operably coupled to a consumer device such as a mobile communication device 235a (e.g. a cellular telephone, Smartphone or other mobile device capable of cellular or wireless communications) or a computer 235b (such as a desktop or laptop home or office computer or tablet computing device capable of communicating with host computer 225 wirelessly or through a wire connection). For ease of explanation, reference is made generally to computing device 235 of consumer 230.

Electronic sources 215a-c are operably coupled to or in communication with intermediate computer 225 through respective networks 240a-c, and intermediate computer 225 is operably coupled to or in communication with one or more of consumer computing devices 235a, 235b through respective networks 240d-e. Examples of networks 240a-e (generally, 240) that may be utilized for communications between system 200 components include but are not limited to a Local Area Network (LAN), a Wide Area Network (WAN), Metropolitan Area Network (MAN), a wireless network, other suitable networks capable of transmitting data, and a combination of such networks. For ease of explanation, reference is made to a network 240 generally, but various networks, combinations of networks and communication systems, methods and protocols may be utilized in embodiments.

According to embodiments, host computer 225 includes or accesses a purchase interval program 250 and a database 255 that are cooperatively operable to aggregate and store item-level electronic transaction data 216 received from electronic sources 215. Purchase interval program 250 may be a stand-alone program or, in the embodiment illustrated in FIG. 2A, a program or module of a financial management system 260 such as receipt collection program or system, one example of which is QUICKRECIEPTS, available from Intuit Inc. Financial management systems 260 such as QUICKRECEIPTS are managed by hosts 220 with whom participating merchants 210 have agreed to provide item-level receipt data 210, and item level-receipt data 216 is associated with a particular consumer 230 using a membership card, club card, or by the consumer 230 registering a credit card with the host 220 such that when item-level receipt data 216 is received at intermediate computer 225, financial management system 260 can allocate the data to consumer 230. Further aspects of one example of a financial management system 260 that collects transaction or receipt data from merchants 210 is described in http://myquickreceipts.com and U.S. application Ser. No. 12/609,922, the contents of which are incorporated herein by reference as though set forth in full.

Purchase interval program 250 receives or accesses item-level electronic transaction data 216 from electronic sources 215 or collected and stored in database 255. Purchase interval program 250 comprises instructions which, when executed, analyze item-level electronic transaction data 216 to determine purchase interval 251 for specific item 212s, or the time between repeat purchases of a specific item 212s. Purchase interval program 250 is also operable to establish communication with consumer computing device 235 regarding the determined purchase interval 251.

Figure 3:
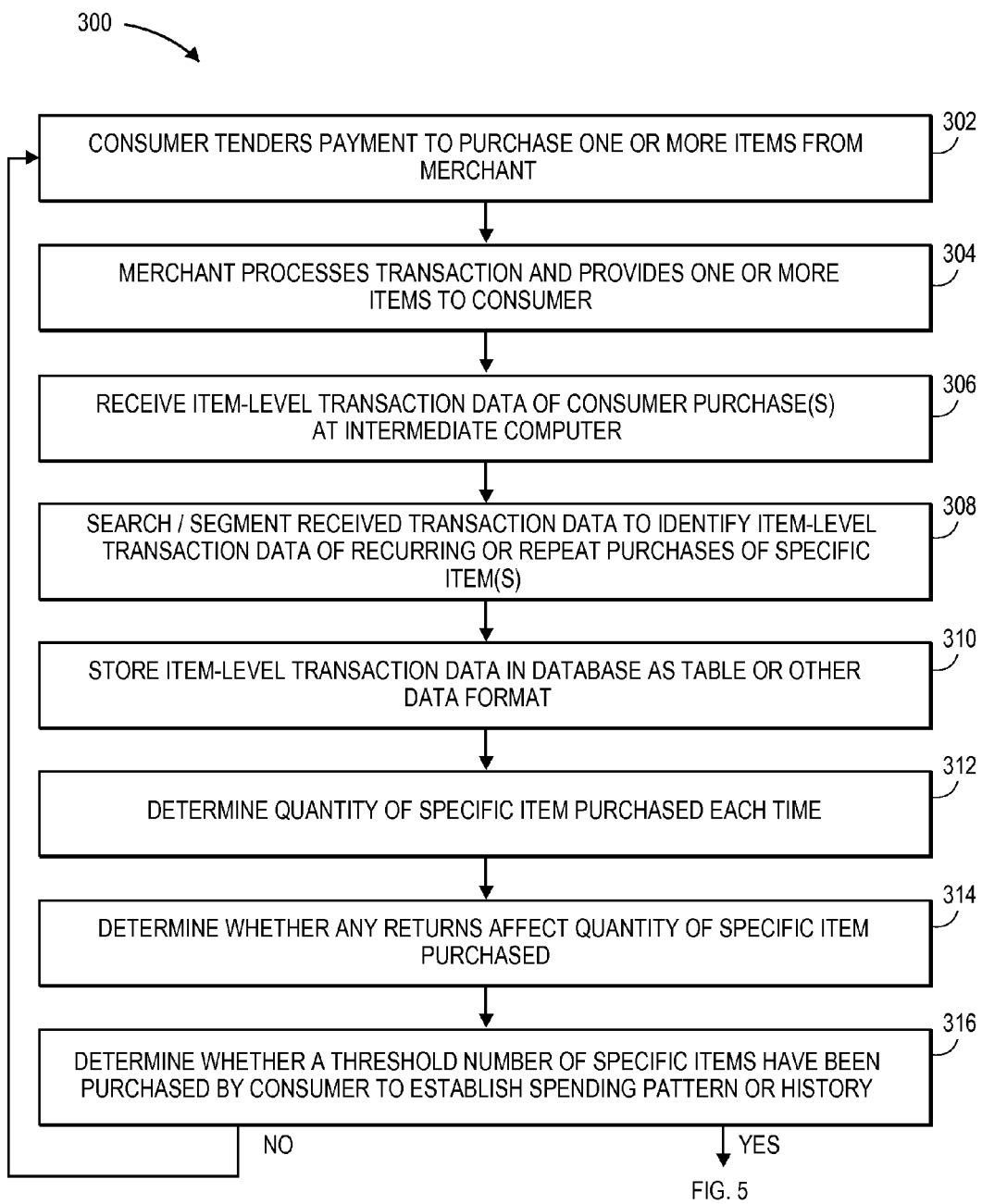
FIG. 3 is a flow chart of an embodiment of a method for processing item-level electronic transaction data for notifying a consumer about purchasing an specific item that the consumer has previously purchased.

With continuing reference to FIG. 2A and with further reference to FIG. 3, one embodiment of a method 300 for determining purchase intervals 251 and for communicating with consumer 230 regarding purchase intervals 251 and that may be implemented with system 200 embodiments described above and other system configurations comprises, at 302, consumer 230 tendering payment to purchase one or more items 212 from merchant(s) 210. Payment may be made using, for example, a payment or transaction card (e.g., credit card, debit card), check, cash and other forms of payment.

Embodiments may apply to purchases of various types of items 212 by various consumers 230 including individual consumers who purchase consumable goods such as groceries, healthcare or personal hygiene items, clothing, books, etc. and services such as dog groomer, house cleaning, car washes, dry cleaning, automobile maintenance, etc., corporate consumer and government consumers (e.g., for purchases of consumables such as office supplies, parts, materials, and other recurring purchases and services). For ease of explanation, reference is made generally to an individual consumer 230 who purchases items from merchant 210 in the form of a grocery store such as VONS or RALPHS or discount store such as TARGET or WAL-MART for purposes of explaining one example of how embodiments may be implemented. It should be understood, however, that embodiments may be applied to analyze repeat purchases of various items purchased by various consumers 230 including goods and/or services purchased by individuals and corporate and government entities.

At 304, merchant 210 processes the transaction and provides purchased item(s) 212 including a specific item 212s to be tracked to consumer 230. If consumer 230 pays with a payment card, the payment card is swiped through POS payment terminal 215, which generates item-level electronic transaction or receipt data 216 for the purchase. A paper or electronic mail receipt identifying the item 212 purchased is also is provided to consumer 230. Merchant 210 may also manually enter item-level electronic transaction data 216 into POS payment terminal 215 (e.g., if consumer 230 pays cash). Item-level electronic transaction data 216 generated or entered by merchant 210 may be Level III data that includes, for example, merchant name, transaction date, transaction amount, form of payment and information specifically identifying item 212 purchased (e.g. by name, description, product code, symbol, model number, etc.). Item-level electronic transaction data 216 is stored electronically by merchant 210, and 302-304 are repeated resulting in consumer 230 purchasing the same item 212s multiple times. This may occur over a matter of days, weeks, months, years or other durations of time, the result being that consumer 230 purchased the same specific item 212s multiple times from one or more merchants 210.

At 306, item-level electronic receipt data 216 is transmitted from POS payment terminal 215 or another associated merchant computer or source to intermediate computer 225. Intermediate computer 225, e.g., using a financial management system 260 such as QUICKRECEIPTS, receives and aggregates item-level electronic receipt data 216 including data 216 related to multiple purchases of the same item 212s by consumer 230.

Embodiments may also involve item-level electronic receipt data 216 that is received at the intermediate computer 225 from consumer 230 or generated based on data provided by consumer 230. For example, consumer 230 may have received an e-mail confirmation or receipt from merchant 210 identifying the particular item purchased, and that e-mail can be forwarded to intermediate computer 225 and analyzed to identify item-level electronic transaction data 216. Further, consumer 230 may photograph or scan the paper receipt and send it to intermediate computer 225. Consumer 230 may also send the paper receipt to host 220, which photographs or scans the receipt to generate item-level electronic transaction data 216. For this purpose, Optical Character Recognition (OCR) and other text recognition methods may be utilized to read data of the paper receipt. For example, embodiments may involve sources of item-level or Level III data such as receipt repositories such as neatreceipts.com, which provide services for scanning receipts, performing OCR processing, and storing receipts.

In the embodiments described above, the system configuration shown involves intermediate computer 225 and purchase interval program 250 or financial management system 260 receiving item-level electronic transaction data 216 from an originator of the data, e.g., from POS payment terminals 215a-c of subscribing or member merchants 210a-c. Other embodiments may involve intermediate computer 225 or purchase interval program 250 receiving or retrieving item-level electronic transaction data 216 from another source.

Figure 2B:
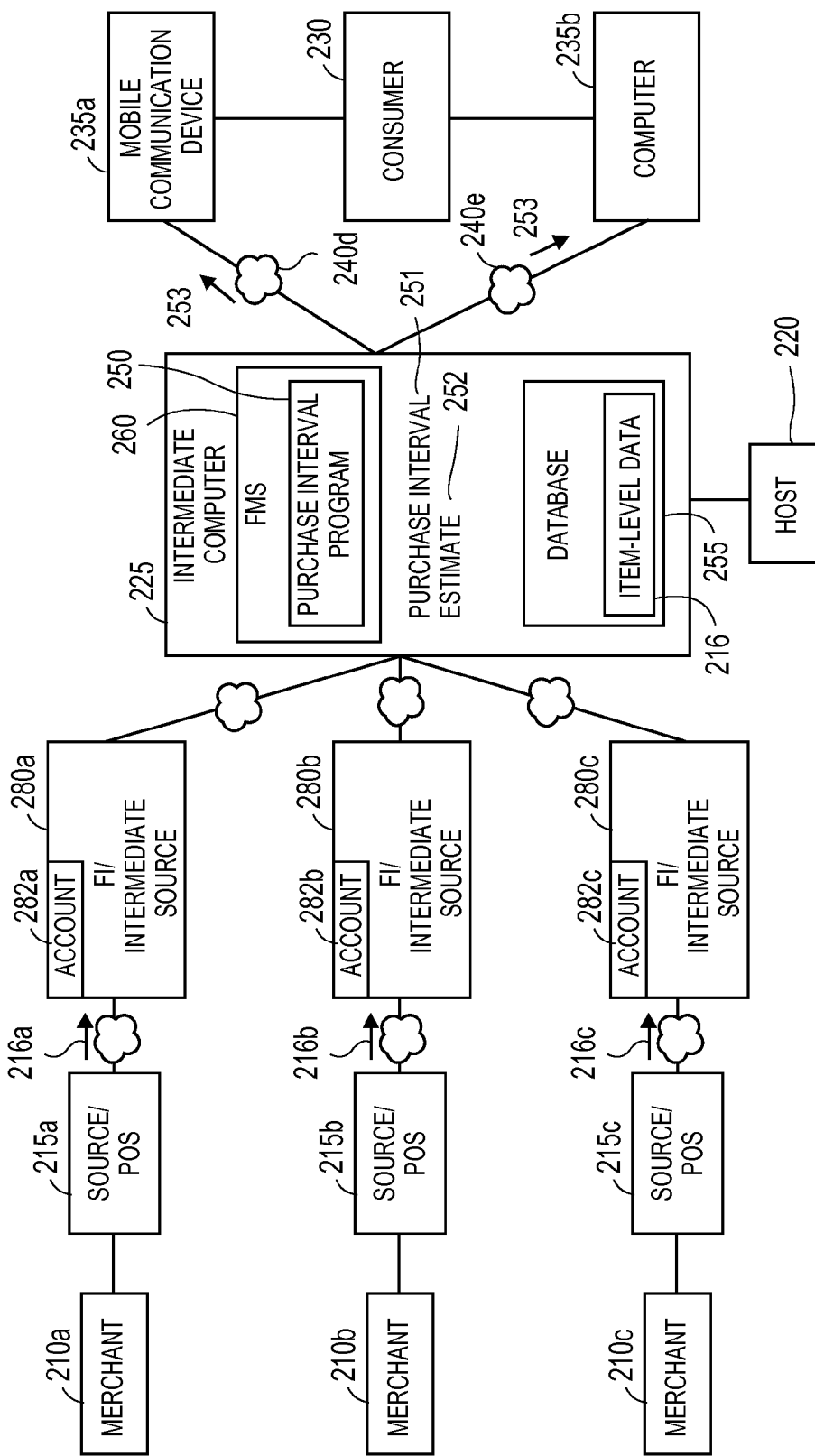
FIG. 2B is a diagram of another embodiment of a system for notifying a consumer about purchasing a specific item that the consumer has previously purchased in which an intermediate computer receives item-level electronic transaction data using an intermediate source or financial management system that accesses user accounts to receive or retrieve item-level transaction data.

In one embodiment, referring to FIG. 2B, purchase interval program 250 may be a stand-alone program or a program or module of a financial management system 260 as shown in FIG. 2B that is operably coupled to or in communication with computers of financial institutions 280a-c (generally, 280, and shown as "FI" in FIG. 2B). Consumer 230 has accounts respective 282a-c (generally, 282) including respective item-level transaction data 216a-c at respective financial institutions 280a-c. Thus, rather than receiving item-level transaction data from an electronic payment device 215 of a merchant 210, such data is received from an account 282 at a FI such as a bank, credit card company or other financial institution 280 at which consumer 230 has an account 282 such as a checking, savings or credit card account including item-level electronic transaction data 216. Financial management systems 260 that may be utilized for this purpose include, for example, desktop or on-line financial management system such as QUICKEN and MINT, both of which are also available from Intuit Inc.

Figure 2C:
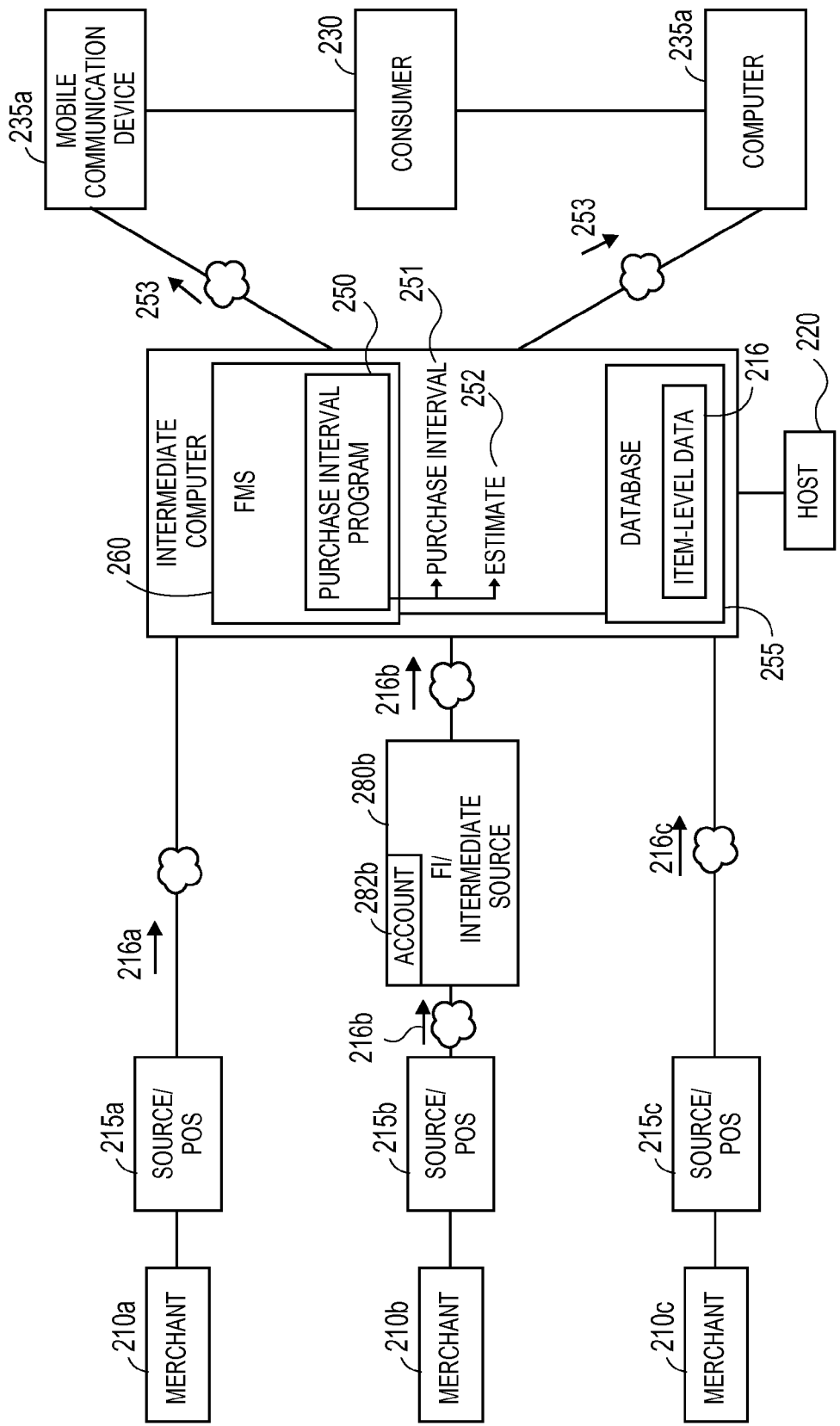
FIG. 2C is a diagram of another embodiment of a system for notifying a consumer about purchasing a specific item that the consumer has previously purchased in which an intermediate computer has a financial management system that receives item-level electronic transaction data from the merchant and from accounts at financial institutions.

FIG. 2C further illustrates another system configuration in which item-level electronic transaction data 216 is received both from an originator of the data (as shown in FIG. 2A) and through an intermediate computer or source, e.g., using a FMS 260 that is configured to receive item-level transaction data 216 from merchants 210 and from accounts 282 at FIs 280.

Thus, the term financial management system 260 as described above with reference to FIGS. 2A-C is defined to include, any computing system implemented, on-line or web-based, system, package, program, module, or application that gathers financial data, has the capability to receive or retrieve financial data including item-level electronic transaction data 216, analyze and categorize at least part of the financial data into various reports or displays that are provided to consumer 230, and provides consumer 230 with the capability to conduct, and/or monitor, financial transactions.

Types of financial management systems 260 include, but are not limited to any of the following: an on-line, or web-based, or computing system implemented receipt collection financial management system, package, program, module, or application (generally, "system"), personal financial management system, personal accounting system, personal asset management system, personal/home business inventory system, business accounting system, business financial management system, business inventory system, business asset management system, healthcare expense tracking system, and data management system as discussed herein, and/or as known in the art at the time of filing, and/or as developed after the time of filing.

Specific examples of financial management systems 260 currently available and that may be utilized to implement embodiments include, but are not limited to: QUICKRECEIPTS, QUICKEN, QUICKEN On-Line, QUICKBOOKS, QUICKBOOKS On-Line, FINANCEWORKS, Mint.com™ and Intuit Healthcare Expense Tracker™, all of which are available from Intuit Inc. of Mountain View, Calif.; MICROSOFT Money of Microsoft, Inc. of Redmond, Wash.; and various other financial management systems 260.

Accordingly, as will be understood, and as generally illustrated in FIGS. 2A-C, embodiments may involve financial management systems 260 that are in communication with one or multiple sources of item-level electronic transaction data 216, which may be received from an originator of the data such as a merchant 210 (defined to include in-store or brick and mortar merchants and on-line merchants that sell various goods or items through respective websites), e.g., from a merchant POS payment terminal 215 or merchant computer, and/or from another source such as an intermediate party, system, financial institution or on-line or credit card account thereof, or website such as a purchase website, e.g., blippy.com, a retailer data source (RDS) such as Afterbot, Inc., which collects transaction data, and other intermediate entities, systems and programs that serve as an interface between intermediate computer 225 or purchase interval program 250 and the source of item-level electronic transaction data 216 such as POS payment terminal 215, cash register or computer of merchant 210. Receiving or acquiring item-level electronic transaction data 216 may involve, for example, Open Financial Exchange (OFX), screen scraping, application program interfaces (APIs), manual user entry, etc.

For ease of explanation, reference is made to a source or merchant 210, and an electronic source, computer or POS payment terminal 215 of merchant 210 that generates item-level electronic transaction data 216 representing purchase of specific item 212s that is collected and stored by a financial management system 260 that receives and collects data from a merchant computer or POS payment terminal 215, but embodiments may involve other parties who are engaged in some aspect of a transaction and that generate or collect item-level electronic transaction data 216. Referring again to FIGS. 2A and 3, at 308, purchase interval program 250 searches or segments transaction data received at or retrieved or generated by intermediate computer 225 to identify recurring purchases of a specific item 212s. For this purpose, purchase interval program 250 may search for specific item 212s identifiers such as name, description, product codes, etc. At 310, item-level electronic transaction data 216 of recurrent purchases of specific item 221s is stored in database 255 as a table or other data format and may be for one or multiple consumers 230.

For example, referring to FIG. 4, in one embodiment, purchase interval program 250 generates a table 400 including item-level electronic transaction data 216 for each consumer 230 that includes a column 402 for consumer identification (e.g., name, user name or registration number with the system), a column for purchase date, a column 406 for item identification (such as item name, description, product code, etc.), and a column 408 for quantity of items purchased. In the illustrated example, some of the items are recurring purchases (four purchases by consumer 1 involve recurring purchases whereas purchases by other consumers do not). FIG. 4 illustrates that this consumer 230 purchased five item 212s during five different shopping trips since one item was purchased during each shopping trip in this example.

Referring again to FIG. 3, at 312, purchase interval program 250 determines the quantity of specific items 212s purchased during a pre-determined time, e.g., items 212s purchased every week, every two weeks, every month, every two months, and other times, which accounts for consumer 230 purchasing one or multiple specific items 212s at a time. At 314, if necessary or as needed and if return data is available, purchase interval program 250 determines whether any returns of specific items 212 affect the quantity of specific items 212 purchased and consumed or to be consumed and that is to be used in determining a purchase interval 251.

At 316, in certain embodiments, purchase interval program 250 determines whether a minimum or threshold number of specific items 212s has been purchased or purchased within a certain time. This may be done to establish an acceptable spending history on the specific item 212s. For example, embodiments may be configured such that an acceptable spending history is established with three, four, five or other numbers of purchases of the same specific item 212s.

If purchase interval program 250 determines that there has not been the threshold or minimum number of purchases of the same item 212s, then the purchase interval program 250 waits for additional purchases and the method goes back to 302. If purchase interval program 250 determines that there have been a sufficient number of purchases of the same item 212, then the method 300 proceeds to FIG. 5.

Figure 5:
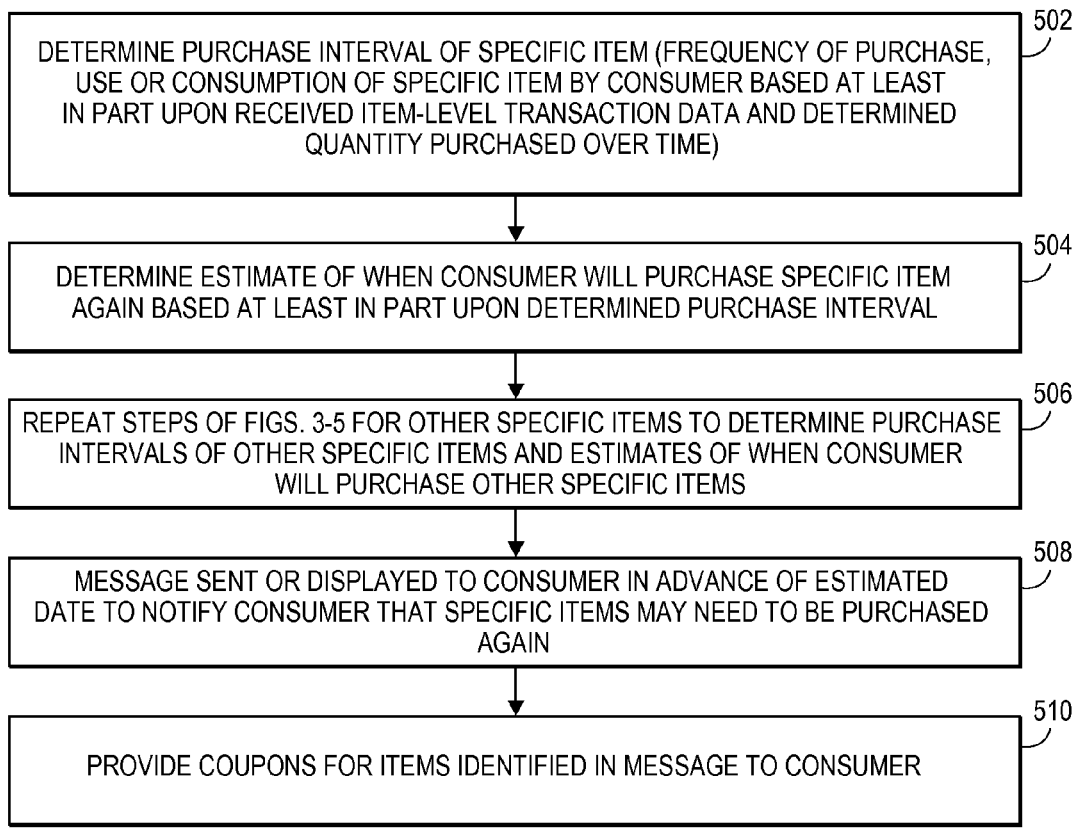
FIG. 5 is a flow chart of an embodiment of a method for notifying a consumer about purchasing a specific item that the consumer has previously purchased and determining when the consumer may need to purchase the item again.

Referring to FIG. 5, at 502, purchase interval program 250 determines or estimates purchase interval 251, which estimates the frequency of purchase or rate of consumption of specific item 212s by consumer 230. This determination is based at least in part upon received item-level transaction data 216 and the determined quantity of specific items 212s purchased over a time.

For example, 502 may involve determining an average number of days between purchases of the specific item 212s, which indicates or approximates how quickly that item 212s is consumed and when that item 212s needs to be purchased again. Thus, purchase intervals 251 for different specific items 212s may vary since different specific items 212s are consumed at different rates.

At 504, purchase interval program 250 estimates when consumer 230 will purchase specific item 212s again based at least in part upon determined purchase interval 251. For example, purchase interval program 250 may indicate a particular estimated date 252 by which specific item 212s will be consumed. This estimate may be based upon the last date the specific item 212s was purchased and the determined purchased interval 251.

At 506, portions of the process of FIG. 3 and FIG. 5 are repeated such that purchase interval program 250 analyzes and generates a purchase interval 251 for each item 212s specifically identified by item-level transaction data 216, generates respective estimated dates 252 when consumer 230 will need to purchase those items 212s again. Purchase intervals 251 of different items 212s may be the same or different, and the dates 252 generated by purchase interval program 250 may be the same or different depending on purchase intervals 251 and the last time each item 212s was purchased.

At 508, purchase interval program 250 sends or displays one or more electronic messages 253 to consumer 230 (e.g., as an e-mail or SMS message to a Page 24 of 48 mobile communication device 224 or as an e-mail to a computer 245b of consumer 230) in advance of estimated date 252 to notify consumer 230 that it may be time to purchase the identified item(s) 212s again.

According to one embodiment, an e-mail or SMS message 253 may identify the item 212s (e.g., SMS of "CHEERIOS"). Such messages may be sufficient in the event that purchase interval program 250 identifies one or a small number of items that may need to be purchased or that consumer 230 is aware that when such a message is received from intermediate computer, it indicates that consumer 230 should check to see if it is necessary to purchase CHEERIOS again. Further, item-level electronic transaction data 216 may identify the type of item or purchase interval program 250 or another program (such as a receipt program) can be used to categorize specific item 212s such that message 253 refer to "cereal."

In another embodiment, purchase interval program 250 displays or sends message 253 in the form of an electronic shopping list (generally, message or shopping list 253), which can be generated and sent to consumers at various times, e.g., weekly, every other week, once per month, etc. Items 212s identified in the shopping list will vary depending on, for example, when they were last purchased, the quantity of items 212s purchased in the past, which affect purchase intervals 251. Thus, different items 212s will be included in the shopping list depending in part upon their respective purchase intervals 251 and prior purchase dates.

Referring again to FIG. 2A, and with continuing reference to FIG. 5, intermediate computer 225 may also be in communication with a computer 265 of a manufacturer or supplier 260 of an item 212s. In these embodiments, purchase interval program 250 can receive coupons 262 from manufacturers or supplies, store coupons 262 in database 251, and when items 212s are the subject of a message or shopping list 253 sent to consumer 230, consumer 230 can also receive coupons 262 for those specific items 212s. Coupons 262 may also be mailed to consumer 230 in advance of estimated date 252.

Consumer 230, with the shopping list 253, then proceeds to purchase items 212s in the shopping list 253 and/or other items. If a specific item 212s in shopping list 253 is not needed at that time, consumer 230 can ignore that item 212s.

FIGS. 6A-F illustrate a more detailed example of how embodiments may be implemented. Referring to FIG. 6A, item-level electronic transaction data 216 received at host computer 225 may be searched and organized in the form of a table 600. In the illustrated embodiment, table 600 includes data related to an example involving weekly purchases from May 1 to June 5 of four specific items 212 by consumer 230: Cereal 1 (e.g. CHEERIOS), Cereal 2 (e.g., RAISIN BRAN), Diapers (e.g., PAMPERS) and Paper Towels (e.g., BRAWNY), as identified by item name, description, product code, etc. of the received item-level electronic transaction data 216. Data of each item 212s is provided in respective columns 602a-d of table 600. Rows 610a-f of table 600 include purchase dates of each item 212s spanning six weeks in this example. Cereal 1 was purchased each week, Cereal 2 was purchased three of the six weeks (every other week), diapers were purchased three of the six weeks, and paper towels were purchased two of the six weeks. For ease of explanation of this example, it is assumed that consumer 230 purchased one of each item at each time. A timeline 610 further illustrating these weekly purchases is illustrated in FIG. 6B.

Purchase interval program 250 determines purchase interval 251 of each of the four specific items 212s based on historical item-level electronic transaction data 216. As shown in FIG. 6C, these determinations are summarized in a table 620 indicating that purchase interval 251a of Cereal 1 (CHEERIOS) is 7 days or one week, purchase interval 251b of Cereal 2 (RAISIN BRAN) is 14 days or two weeks, purchase interval 251c of Diapers (PAMPERS) is also 14 days or two weeks, and purchase interval 251d of Paper Towels (BRAWNY) is 21 days or three weeks. In the illustrated example, purchase intervals 251b,c of Cereal 2 (RAISIN BRAN) and Diapers (PAMPERS) are the same even though RAISIN BRAN and PAMPERS s were purchased at different times due considering the average number of items 212s purchased over the same time.

Having determined purchase interval 251a-d, and determining that consumer 230 shops for groceries once every week (e.g. based on item-level electronic transaction data 216 and/or consumer 230 input), purchase interval program 250 may generate a message or shopping list 253 for shopping during the following or next week. If it is determined that consumer 230 shops on Saturdays or Sundays, purchase interval program 250 can be configured to send an electronic message 253 to consumer 230 on a Wednesday or Thursday or other pre-determined time before consumer 230 is expected to shop.

Referring to FIG. 6D, shopping list 253 for the following week (June 12), includes Cereal 1 (CHEERIOS) and Diapers (PAMPERS) since it was determined that purchase interval 251a of CHEERIOS was one week and CHEERIOS was purchased about one week ago, and since it was determined that Diapers (PAMAPERS) have a purchase interval 251b of two weeks, and it was determined that PAMPERS were purchased about two weeks ago.

Referring to FIG. 6E, shopping list 253 for week 8 (June 19) includes Cereal 1 (CHEERIOS) and Cereal 2 (RAISIN BRAN) since it was determined that CHEERIOS has a purchase interval 251a of one week and was purchased about one week ago, and since it was determined that RAISIN BRAN has a purchase interval 251b of two weeks and it was determined that RAISIN BRAN was purchased about two weeks ago.

Referring to FIG. 6F, shopping list 253 for week 9 (June 26) includes Cereal 1 (CHEERIOS), Diapers (PAMPERS) and Paper Towels (BRAWNY) since it was determined that CHEERIOS has a purchase interval 251a of one week and was purchased about one week ago, it was determined that PAMPERS has a purchase interval 251c of two weeks and it was determined that diapers were purchased about two weeks ago, and it was determined that BRAWNY has a purchase interval 251d of three weeks and it was determined that paper towels were purchased about three weeks ago.

In this manner, purchase interval program 250 monitors actual consumer 230 spending on specific items 212s to determine when such items 212s will have been consumers 230 and to alert consumers 230 before that time as a reminder that it may be necessary to purchase those items 212s again. It should be understood that while the above example of how embodiments may be implemented involving a single purchase of an item 212s at a time, embodiments may involve the consumer 23—purchasing multiple items 212s at one time, which would affect purchase interval 250 and message or shopping list 253 sent to consumer 230.

Figure 7:
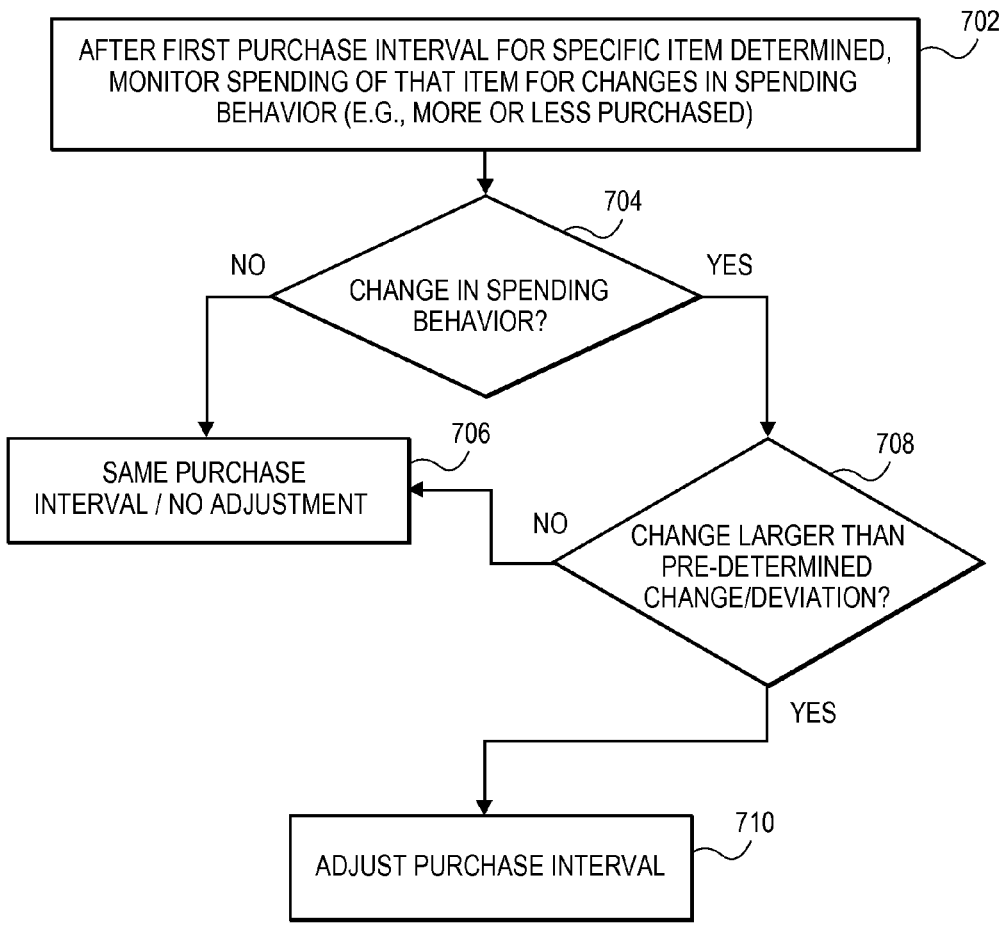
FIG. 7 is a flow chart of one embodiment of a method for monitoring consumer purchases after a purchase interval has been determined to dynamically adjust purchase intervals based upon changes of consumer purchases of specific items.

Referring to FIG. 7, embodiments may also utilize a feedback to dynamically adjust purchase interval 251 based on changes in consumer 230 spending on a specific item 212s. For example, while the example in FIGS. 6A-E involve consumer 230 purchasing diapers once every two weeks, consumer 230 may have had another baby, thus requiring additional diapers and resulting in consumer 230 purchasing diapers every week rather than every other week.

More particularly, at 702, after purchase interval 250 is determined based upon an acceptable number of prior purchases, purchase interval program 250 continues to monitor consumer 230 spending on that specific item 212s. At 704, purchase interval program 250 determines whether there is a change in spending behavior over time on that item 212s. If not, then at 706, the original purchase interval 251 for that item 212s continues to be utilized. However, if a change in purchasing a specific item has been detected, the original purchase interval 251 may continue to be used or be adjusted automatically as purchase activity changes. In other embodiments, purchase interval 251 is adjusted only if the change is sufficiently large and deviates from "normal" fluctuations thus indicating a substantial change in spending on the specific item. Thus, in these embodiments, at 708, purchase interval program 250 determines whether purchase interval 251 change is greater than a pre-determined amount. If not, then the original purchase interval 251 continues to be utilized. If so then purchase interval program 250 can adjust purchase interval 251, e.g., based upon an average number of items 212s purchased during a certain time as discussed above.

In one embodiment, purchase interval 251 is changed upon determining a change of spending on a particular item 212s. According to another embodiment, purchase interval program 250 analyzes item-level electronic transaction data 216 to determine whether there is a minimum or threshold number of purchases of the new spending pattern before changing the purchase interval 251.

Figure 8A:
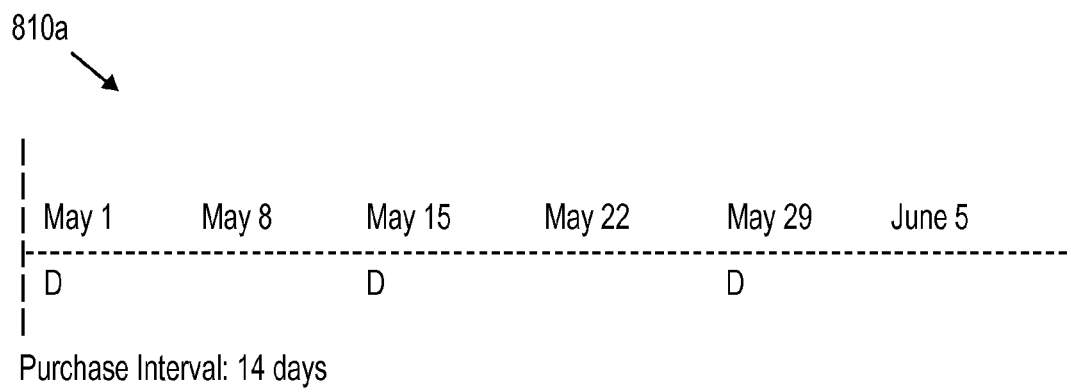
FIGS. 8A-B illustrate an example of how a purchase interval may be dynamically adjusted.
Figure 8B:
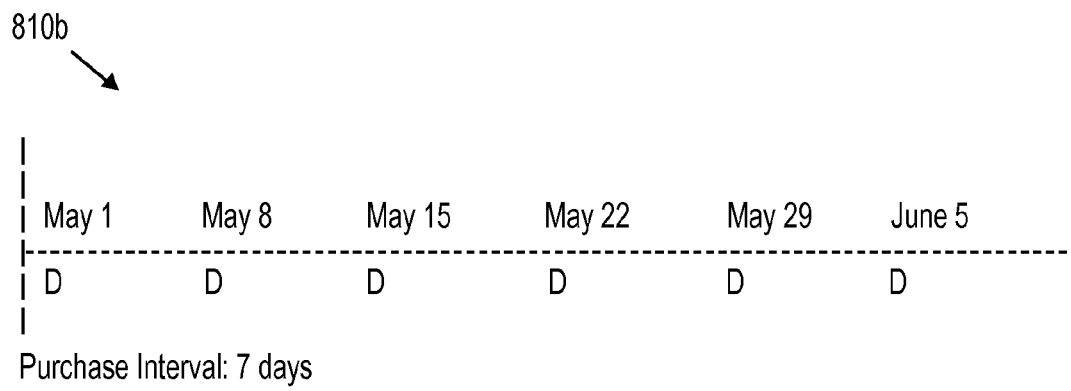

For example, referring to the timeline 810a shown in FIG. 8A, and continuing with the example of consumer 230 purchasing diapers, consumer 230 initially purchased diapers on average once every two weeks. However, referring to the timeline 810b shown in FIG. 8B, consumer 230 had another baby and now purchases diapers every week. This change is detected by purchase interval program 250, and purchase interval 251 is dynamically adjusted to reflect additional diaper purchases and such that message or shopping list 253 provided to consumer 230 will be updated to reflect more frequent diaper purchases.

Figure 9A:
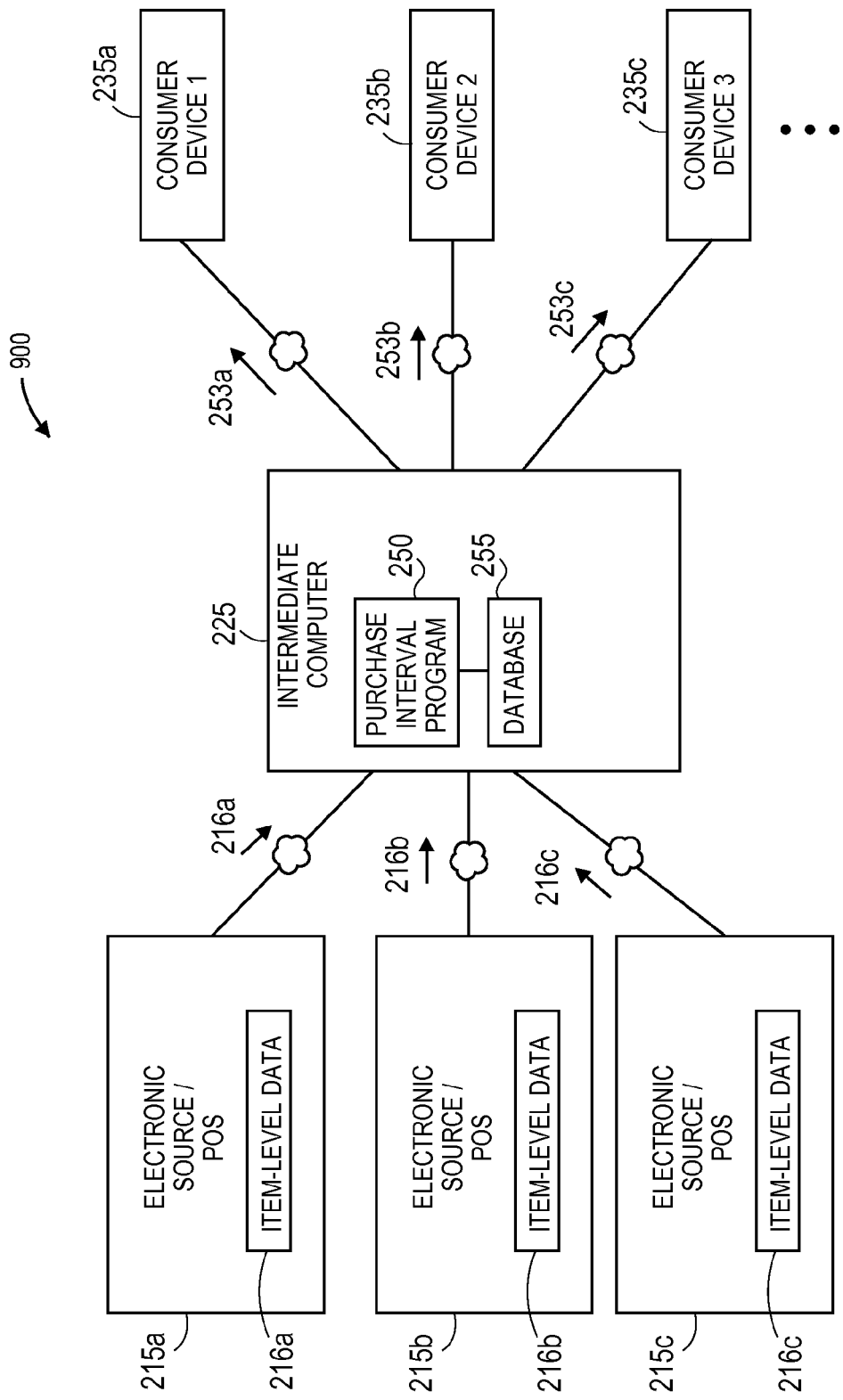

Referring to FIG. 9A, while certain embodiments have been described with reference to specific items 212s purchased by a particular consumer 230, embodiments may apply to monitoring item-level spending and notifying multiple consumers 230n, e.g., two, three, ten, hundreds and thousands of consumers 230 who participate in a purchase tracking program of the host 220 or who purchase or sign up for the purchase interval program 250. Thus, in the illustrated system 900 embodiment, intermediate computer 220 is operably coupled to or in communication with various sources 215a-i of item-level receipt data 216a-i, which is provided to intermediate computer 220. Purchase interval program 250 processes this data such that each consumer 230a-c receives their respective messages or shopping lists 235a-c based on their respective purchase intervals 251, estimated dates 252 and purchase history. Referring to FIGS. 9B-D, shopping lists 235a-c for each consumer 230a-c are generated and may change week to week or during other time frames given the variable purchase intervals of their respective items purchased by respective consumers, as discussed above with respect to embodiments involving a single consumer 230.

Figure 10:
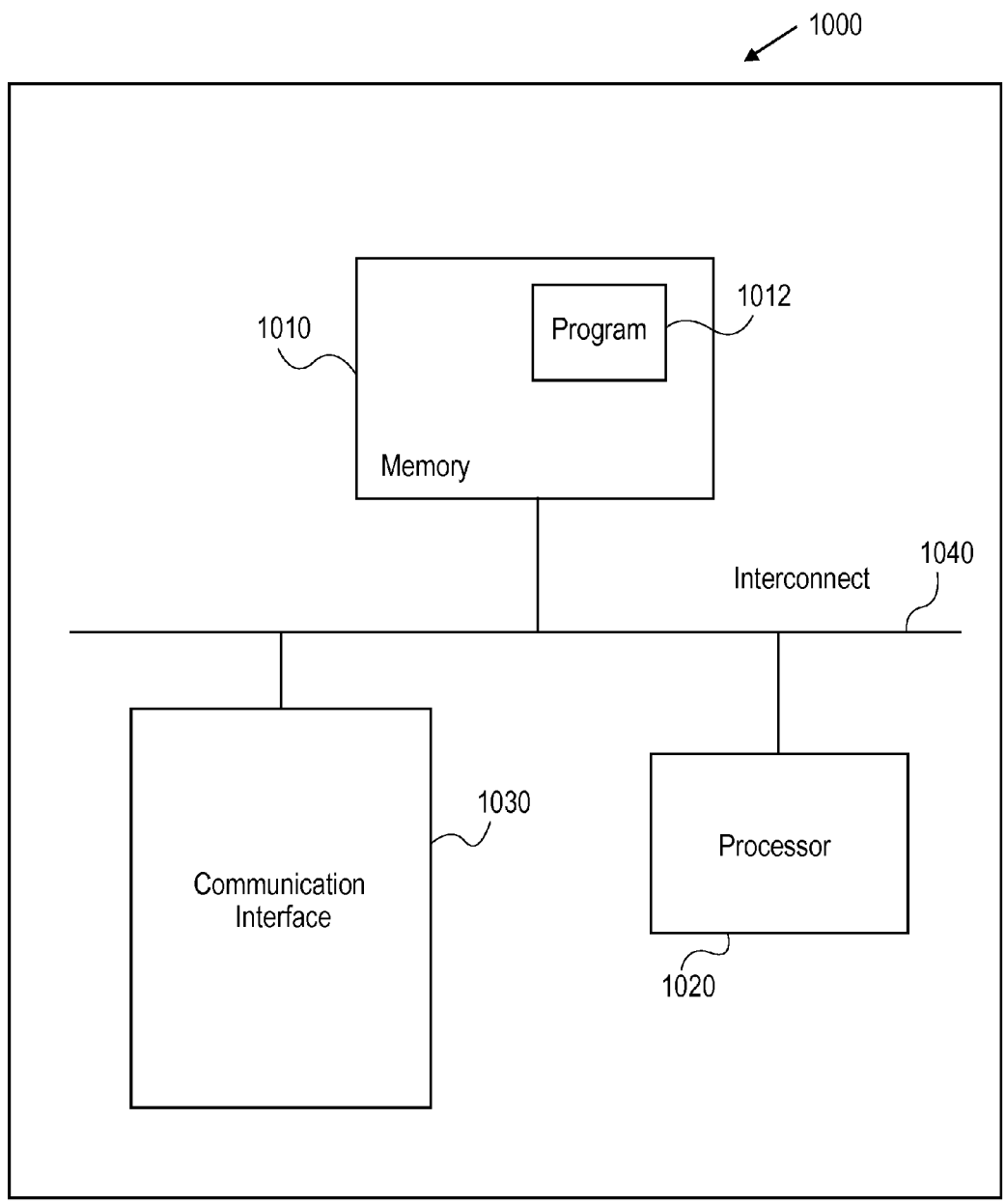
FIG. 10 is a block diagram of components of a computing apparatus or system in which various embodiments may be implemented or that may be utilized to execute embodiments.

FIG. 10 generally illustrates components of a computing device 1000 that may be utilized to execute embodiments and that includes a memory 1010, account processing program instructions 1012, a processor or controller 1020 to execute account processing program instructions 1012, a network or communications interface 1030, e.g., for communications with a network or interconnect 1040 between such components. The memory 1010 may be or include one or more of cache, RAM, ROM, SRAM, DRAM, RDRAM, EEPROM and other types of volatile or non-volatile memory capable of storing data. The processor unit 1020 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 1040 may include a system bus, LDT, PCI, ISA, or other types of buses, and the communications or network interface may, for example, be an Ethernet interface, a Frame Relay interface, or other interface. The network interface 1030 may be configured to enable a system component to communicate with other system components across a network which may be a wireless or various other networks. It should be noted that one or more components of computing device 1000 may be located remotely and accessed via a network. Accordingly, the system configuration provided in FIG. 10 is provided to generally illustrate how embodiments may be configured and implemented.

Method embodiments may also be embodied in, or readable from, a computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 1020 executes program instructions 1012 within memory 1010 and/or embodied on the carrier to implement method embodiments. Further, embodiments may reside and execute on a mobile communication device such as a cellular telephone or Smartphone.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

For example, while certain embodiments are described with reference items in the form of goods, embodiments may also involve items in the form of services or both good and services consumed by individuals and corporate and government entities.

As a further example, embodiments may involve purchase interval program that is a stand alone program or that is part of another system or program such as a financial management system that is in communication with merchant payment devices and/or financial institutions hosting consumer accounts. While embodiments are described with reference to shopping lists that identify particular brands (e.g., CHEERIOS and PAMPERS), they may also refer to good and services generally or by category (e.g., cereal, diapers, dog grooming, etc.), which may be determined from item-level electronic transaction data or categorized by purchase interval program or another program such as QUICKRECEIPTS. Further, consumers may purchase the same specific items in the shopping list again (e.g., due to brand loyalty) or consumer may purchase other brands of products identified in shopping list. For example, shopping list may identify "diapers" or "PAMPERS" but consumer may purchase another brand of diapers such as HUGGIES because HUGGIES is on sale. In both cases, however, electronic shopping lists generated and sent to consumer according to embodiments notify consumer about which items should be purchased again.

Further, while embodiments are described with reference to purchase intervals based on purchase history which, is based in part upon how quickly an item is consumed, embodiments may also apply to alert consumers of potentially expired items. For this purpose, the host computer is operably coupled to or in communication with computers of manufacturers or suppliers of specific items, and host computer receives information about the useful life of items or expiration dates. This data can also be stored in a database with item-level electronic transaction data. Thus, when purchase interval program notes consumer purchased Cereal 1 and Cereal 2, purchase interval program, having that data, can look up or requests information from those cereal producers about expiration dates of the cereals. If the purchase interval program determines that a particular cereal was purchased on a particular date, but was not repurchased within before the expiration date, the purchase interval program may send a message to the consumer that the consumer should check to see if the consumer still has the cereal and check the expiration date to determine whether the cereal can still be consumed or whether it should be discarded and another box purchased. This may be particularly useful for items that have short shelf lives.

Further, item level electronic transaction data sent to host computer can be stored based on various types of purchase including, but not limited to, credit card, debit card, check, electronic check, ATM withdrawal, ACH and other forms of electronic transactions. Receipt data that is sent to the host computer may also be generated as a result of cash purchases, and paper receipts can be scanned and processed for inclusion in the receipt database.

Where methods described above indicate certain events occurring in certain order, those of ordinary skill in the art having the benefit of this disclosure would recognize that the ordering may be modified and that such modifications are in accordance with the variations of the invention. Additionally, parts of methods may be performed concurrently in a parallel process when possible, as well as performed sequentially.

Accordingly, embodiments are intended to exemplify alternatives, modifications, and equivalents that may fall within the scope of the claims.

What is claimed is:

1. A computer-implemented method for notifying a consumer about recurring purchases of the same item, the computer-implemented method being performed by an intermediate computer in communication with a computing device of a consumer and respective computers of respective electronic sources through respective networks, the computer-implemented method comprising:

aggregating, by the intermediate computer, respective item-level electronic transaction data from respective electronic sources, the aggregated item-level electronic transaction data representing respective prior purchases by the consumer;

identifying, by the intermediate computer and within the aggregated item-level electronic transaction data, first item-level electronic transaction data of recurring purchases of a first item by the consumer;

determining, by the intermediate computer, a first purchase interval of the first item based at least in part upon the first item-level electronic transaction data;

generating, by the intermediate computer, a first estimate comprising a first estimated date when the consumer will purchase the first item again based at least in part upon the determined first purchase interval; and notifying the consumer about purchasing the first item again before or on the first estimated date.

2. The method of claim 1, the aggregated item-level electronic transaction data being received from a financial management system hosted by the intermediate computer and utilized by the consumer to access consumer account data, the item-level electronic transaction data being aggregated by the financial management system from respective electronic sources.

3. The method of claim 2, the item-level electronic transaction data being received by the financial management system from an electronic source comprising a computer of a financial institution at which the consumer has an account.

4. The method of claim 3, the respective item-level electronic transaction data being received by the financial management system from electronic sources comprising respective computers of respective financial institutions at which consumer has respective accounts.

5. The method of claim 2, the item-level electronic transaction data being received by the financial management system from an electronic source comprising an electronic payment device of a merchant.

6. The method of claim 5, the respective item-level electronic transaction data being received from electronic sources comprising respective electronic payment devices of respective merchants.

7. The method of claim 2, the aggregated item-level electronic transaction data comprising:
first item-level electronic transaction data of a first electronic source comprising an electronic payment device of a merchant, and
second item-level electronic of a second electronic source comprising a computer of a financial institution at which the consumer has an account.

8. The method of claim 1, the aggregated item-level electronic transaction data comprising Level III data.

9. The method of claim 1, the first item-level electronic transaction data specifically identifying the first item by an identifier selected from the group consisting of a name, a description, a code and a symbol.

10. The method of claim 1, further comprising determining, by the intermediate computer, whether the first item was purchased a minimum number of times within a pre-determined amount of time based at least in part upon the first item-level electronic transaction data to establish a purchase pattern for the first item, the first estimate being generated when the first item was purchased a minimum number of times within the pre-determined amount of time.

11. The method of claim 1, notifying the consumer comprising transmitting an electronic message to a mobile communication device or a computer of the consumer.

12. The method of claim 1, further comprising:
monitoring, by the intermediate computer, subsequent purchases of the first item;
determining, by the intermediate computer, a second purchase interval reflecting a different number of purchases of the first item within a pre-determined amount of time relative to the first purchase interval;
generating, by the intermediate computer, a second estimate comprising a second estimated date when the consumer will purchase the first item again based, at least in part, upon the determined second purchase interval; and
notifying the consumer about purchasing the first item again before or on the second estimated date.

13. The method of claim 1, further comprising:
identifying, by the intermediate computer and within the aggregated item-level electronic transaction data, second item-level electronic transaction data of recurring purchases of a second item by the consumer, the second item being different than the first item;
determining, by the intermediate computer, a second purchase interval of the second item based at least in part upon the second item-level electronic transaction data;
generating, by the intermediate computer, a second estimate comprising a second estimated date when the consumer will purchase the second item again based at least in part upon the determined second purchase interval; and
notifying the consumer about purchasing the first item before or on the first estimated data and about purchasing the second item before or on the second estimated date.

14. The method of claim 1, the first purchase interval being determined based upon an average number of purchases of the first item during a pre-determined amount of time.

15. The method of claim 1, further comprising the intermediate computer
receiving an expiration date of the first item from a computer of a manufacturer or supplier;
determining a date the first item was purchased based at least in part upon the first item-level electronic transaction data;
determining whether the first item was repurchased before the expiration date; and
notifying the consumer when the intermediate computer determines that the first item was not repurchased before the determined expiration date.

16. A computer program product comprising a non-transitory computer readable storage medium embodying one or more instructions executable by an intermediate computer in communication with a computing device of a consumer through a first network and respective computers of respective electronic sources through respective other networks, to perform a process for notifying a consumer about recurring purchases of the same item, the process comprising aggregating respective item-level electronic transaction data from respective electronic sources, the aggregated item-level electronic transaction data representing respective prior purchases by the consumer, identifying, within the aggregated item-level electronic transaction data, first item-level electronic transaction data of recurring purchases of a first item by the consumer, determining a first purchase interval of the first item based at least in part upon the first item-level electronic transaction data, generating a first estimate comprising a first estimated date when the consumer will purchase the first item again based at least in part upon the determined first purchase interval, and notifying the consumer about purchasing the first item again before or on the first estimated date.

17. The computer program product of claim 16, the aggregated item-level electronic transaction data being received from a financial management system hosted by the intermediate computer and utilized by the consumer to access consumer account data, the financial management system aggregating item-level electronic transaction data from respective electronic sources.

18. The computer program product of claim 17, the financial management system receiving item-level electronic transaction data from a computer of a financial institution at which the consumer has an account.

19. The computer program product of claim 18, the financial management system receiving respective item-level electronic transaction data from respective computers of respective financial institutions at which consumer has respective accounts.

20. The computer program product of claim 17, the financial management system receiving item-level electronic transaction data from an electronic payment device of a merchant.

21. The computer program product of claim 20, the financial management system receiving respective item-level electronic transaction data from respective electronic payment devices of respective merchants.

22. The computer program product of claim 17, the aggregated item-level electronic transaction data comprising
first item-level electronic transaction data of an electronic payment device of a merchant, and
second item-level electronic transaction data of a computer of a financial institution at which the consumer has an account.

23. The computer program product of claim 16, the aggregated item-level electronic transaction data comprising Level III data.

24. The computer program product of claim 16, the first item-level electronic transaction data specifically identifying the first item by an identifier selected from the group consisting of a name, a description, a code and a symbol.

25. The computer program product of claim 16 comprising one or more additional instructions executable by the intermediate computer to determine whether the first item was purchased a minimum number of times within a pre-determined amount of time based at least in part upon the first item-level electronic transaction data to establish a purchase pattern for the first item, the first estimate being generated when the first item was purchased a minimum number of times within the pre-determined amount of time.

26. The computer program product of claim 16, the consumer being notified by sending an electronic message from the intermediate computer to a mobile communication device or a computer a computing mobile communication device.

27. The computer program product of claim 16 comprising one or more additional instructions executable by the intermediate computer to perform further process steps comprising:
monitoring subsequent purchases of the first item;
determining a second purchase interval reflecting a different number of purchases of the first item within a pre-determined amount of time relative to the first purchase interval;
generating a second estimate comprising a second estimated date when the consumer will purchase the first item again based at least in part upon the determined second purchase interval; and
notifying the consumer about purchasing the first item again before or on the second estimated date.

28. The computer program product of claim 16 comprising one or more additional instructions executable by the intermediate computer to perform further process steps comprising
identifying second item-level electronic transaction data of recurring purchases of a second item by the consumer, the second item being different than the first item;
determining a second purchase interval of the second item;
generating a second estimate comprising a second estimated date when the consumer will purchase the second item again based at least in part upon the determined second purchase interval; and
notifying the consumer about purchasing the first item before or on the first estimated data and about purchasing the second item before or on the second estimated date.

29. The computer program product of claim 16, the first purchase interval being determined based upon an average number of purchases of the first item during a pre-determined amount of time.

30. The computer program product of claim 16 further comprising one or more instructions executable by the intermediate computer for
receiving an expiration date of the first item from a computer of a manufacturer or supplier;
determining a date the first item was purchased based at least in part upon the first item-level electronic transaction data;
determining whether the first item was repurchased before the expiration date; and
notifying the consumer when the intermediate computer determines that the first item was not repurchased before the determined expiration date.

31. A system for notifying a consumer about recurring purchases of the same item, the system comprising:
an intermediate computer in communication with a computing device of a consumer through a first network and respective computers of respective electronic sources through respective other networks,
the intermediate computer being configured to aggregate respective item-level electronic transaction data representing respective prior purchases by the consumer from respective computers of respective electronic sources, identify, within the aggregated item-level electronic transaction data, first item-level electronic transaction data of recurring purchases of a first item by the consumer, determine a first purchase interval of the first item based at least in part upon the first item-level electronic transaction data, generate a first estimate comprising a first estimated date when the consumer will purchase the first item again based at least in part upon the determined first purchase interval, and notify the consumer about purchasing the first item again before or on the first estimated date.

32. The system of claim 31, the intermediate computer hosting a financial management system utilized by the consumer to access consumer account data, the financial management system being configured to aggregate item-level electronic transaction data from respective electronic sources.

33. The system of claim 32, the financial management system being configured to receive item-level electronic transaction data from a computer of a financial institution at which the consumer has an account.

34. The system of claim 33, the financial management system being configured to receive respective item-level electronic transaction data from respective computers of respective financial institutions at which consumer has respective accounts.

35. The system of claim 32, the financial management system being configured to receive item-level electronic transaction data of an electronic payment device of a merchant.

36. The system of claim 35, the financial management system being configured to receive respective item-level electronic transaction data of respective electronic payment devices of respective merchants.

37. The system of claim 32, the aggregated item-level electronic transaction data comprising first item-level electronic transaction data of an electronic payment device of a merchant, and second item-level electronic transaction data of a financial institution at which the consumer has an account.

38. The system of claim 31, the aggregated item-level electronic transaction data comprising Level III data.

39. The system of claim 31, the first item-level electronic transaction data specifically identifying the first item by an identifier selected from the group consisting of a name, a description, a code and a symbol.

40. The system of claim 31, the intermediate computer being further configured to determine whether the first item was purchased a minimum number of times within a pre-determined amount of time based at least in part upon the first item-level electronic transaction data to establish a purchase pattern for the first item and to generate the first estimate when the first item was purchased a minimum number of times within the pre-determined amount of time.

41. The system of claim 31, the intermediate computer being configured to notify the consumer by transmitting an electronic message to a mobile communication device or a computer of the consumer.

42. The system of claim 31, the intermediate computer being further configured to monitor subsequent purchases of the first item;

determine a second purchase interval reflecting a different number of purchases of the first item within a pre-determined amount of time relative to the first purchase interval;

generate a second estimate comprising a second estimated date when the consumer will purchase the first item again based at least in part upon the determined second purchase interval; and notify the consumer about purchasing the first item again before or on the second estimated date.

43. The system of claim 31, the intermediate computer being further configured to identify, within aggregated item-level electronic transaction data, second item-level electronic transaction data of recurring purchases of a second item by the consumer, the second item being different than the first item;

determine a second purchase interval of the second item based at least in part upon the second item-level electronic transaction data;

generate a second estimate comprising a second estimated date when the consumer will purchase the second item again based at least in part upon the determined second purchase interval; and notify the consumer about purchasing the first item before or on the first estimated date and about purchasing the second item before or on the second estimated date.

44. The system of claim 31, the intermediate computer being configured to determine the first purchase interval being based upon an average number of purchases of the first item during a pre-determined amount of time.

45. The system of claim 31, further comprising the sources of item-level electronic transaction data.

46. The system of claim 31, the intermediate computer being further configured to receive electronic expiration data from a source of an item purchased by the customer and for which the intermediate computer has received item-level electronic transaction data;

determine a date the item was purchased based at least in part upon the received item-level electronic transaction data;

determine an expiration date based at least in part upon the received electronic expiration data and the date the item was purchased;

determine whether the item has been repurchased before the determined expiration date; and notify the consumer when the intermediate computer determines that the item has not been repurchased before the determined expiration date.

* * * * *